United States Patent
Wong et al.

(10) Patent No.: US 6,480,259 B1
(45) Date of Patent: Nov. 12, 2002

(54) METHOD AND APPARATUS FOR PRINTING MONOCHROMATIC IMAGES USING A SPATIAL LIGHT MODULATOR HAVING A SELECTABLE LIGHT SOURCE

(75) Inventors: Victor C. Wong, Rochester, NY (US); Badhri Narayan, Rochester, NY (US); Dan S. Talbot, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 92 days.

(21) Appl. No.: 09/675,327

(22) Filed: Sep. 28, 2000

(51) Int. Cl.$^7$ ............................................. G03B 27/68
(52) U.S. Cl. ........................................ 355/52; 355/37
(58) Field of Search ............................. 355/42, 37, 52, 355/46

(56) References Cited

U.S. PATENT DOCUMENTS

| | | | |
|---|---|---|---|
| 4,624,558 A | | 11/1986 | Johnson |
| 4,652,928 A | * | 3/1987 | Endo et al. ................. 348/219 |
| 4,728,965 A | | 3/1988 | Kessler et al. |
| 4,777,514 A | | 10/1988 | Theer et al. |
| 5,015,064 A | * | 5/1991 | Detig et al. ..................... 355/1 |
| 5,030,970 A | | 7/1991 | Rau et al. |
| 5,089,691 A | * | 2/1992 | Morisaki et al. ............ 235/375 |
| 5,281,987 A | * | 1/1994 | Nagata ........................ 396/210 |
| 5,315,411 A | * | 5/1994 | Blanding .................... 348/219 |
| 5,325,137 A | | 6/1994 | Konno et al. |
| 5,461,411 A | * | 10/1995 | Florence et al. ............ 347/240 |
| 5,521,748 A | | 5/1996 | Sarraf |
| 5,539,568 A | * | 7/1996 | Lin et al. ...................... 355/53 |
| 5,652,661 A | | 7/1997 | Gallipeau et al. |
| 5,657,112 A | * | 8/1997 | Yamamoto et al. ........... 355/43 |
| 5,701,185 A | | 12/1997 | Reiss et al. |
| 5,743,610 A | | 4/1998 | Yajima et al. |
| 5,745,156 A | | 4/1998 | Federico et al. |
| 5,757,348 A | * | 5/1998 | Handschy et al. ............ 345/87 |
| 5,808,800 A | * | 9/1998 | Handschy et al. ............ 349/11 |
| 5,936,708 A | * | 8/1999 | Saita .......................... 347/226 |
| 5,971,545 A | * | 10/1999 | Haitz .......................... 349/69 |
| 6,088,083 A | * | 7/2000 | Meier ....................... 250/201.3 |
| 6,208,812 B1 | * | 3/2001 | Sato et al. .................. 396/210 |
| 6,215,547 B1 | * | 4/2001 | Ramanujan et al. .......... 355/32 |

* cited by examiner

Primary Examiner—Russell Adams
Assistant Examiner—D. Ben Esplin
(74) Attorney, Agent, or Firm—Nelson Adrian Blish

(57) ABSTRACT

A monochrome printer (100) and a method for printer optics design utilizing a spatial light modulator (52), able to deploy a number of possible monochromatic light sources for use with a number of different types of photosensitive media (160), are disclosed. The printer provides high resolution and grayscale imaging capability for monochromatic applications such as micrographics and for diagnostic imaging. In the apparatus and method, illumination optics (11) receive a source light beam, from one or more LEDs or from a number of other possible monochromatic light sources available on the printer (100), uniformize and polarize the beam, and direct the beam through a polarization beamsplitter element (50). The polarization beamsplitter element (50) directs one polarization state of light to an LCD spatial light modulator (52). The LCD spatial light modulator (52) modulates the polarization of the polarized beam to provide output exposure energy suitable for image marking on dry or aqueous photosensitive media (160). An optional sensor (234) allows printer (100) to automatically select a monochromatic light source of appropriate wavelength for a given type of photosensitive media (160).

52 Claims, 11 Drawing Sheets

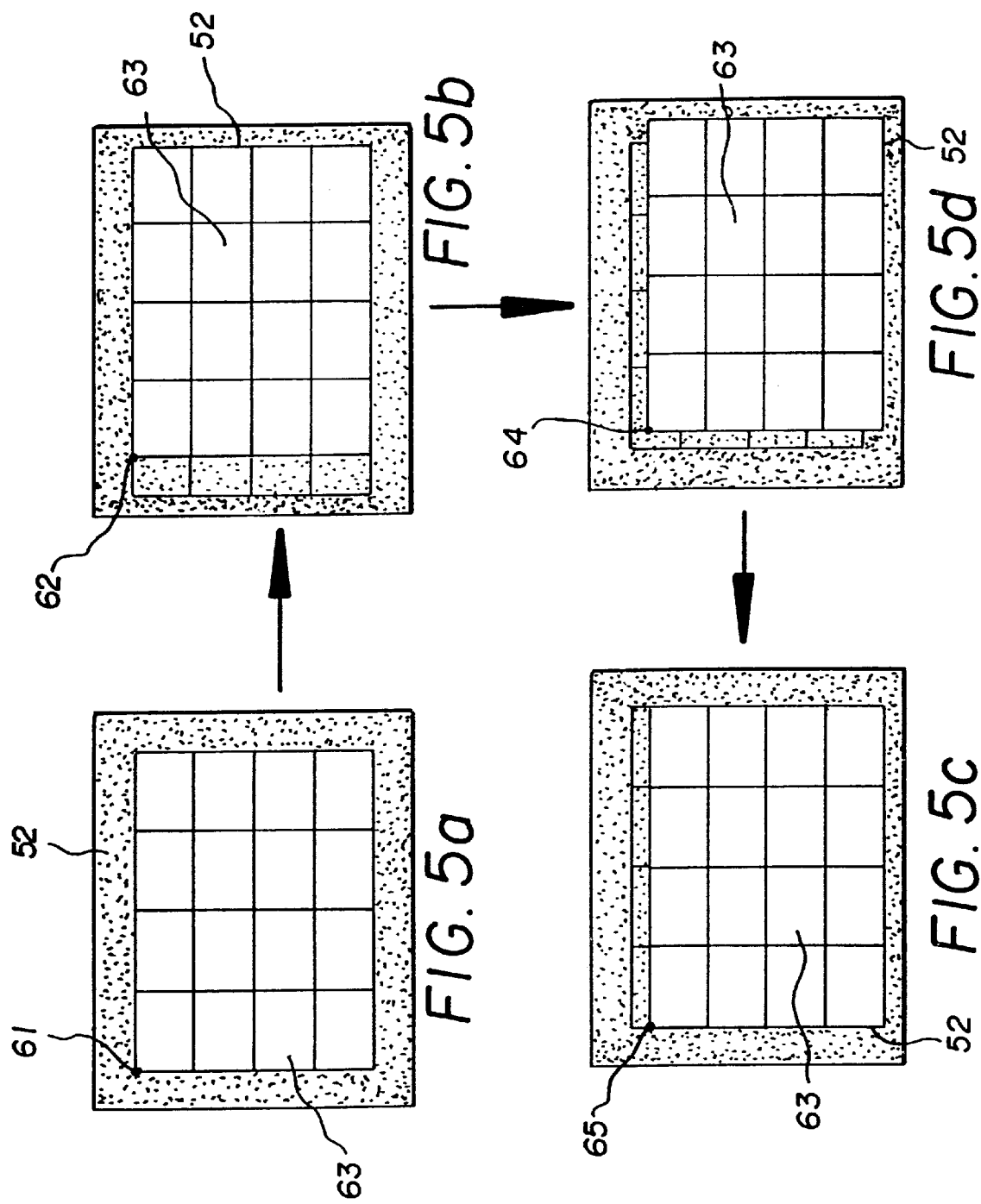

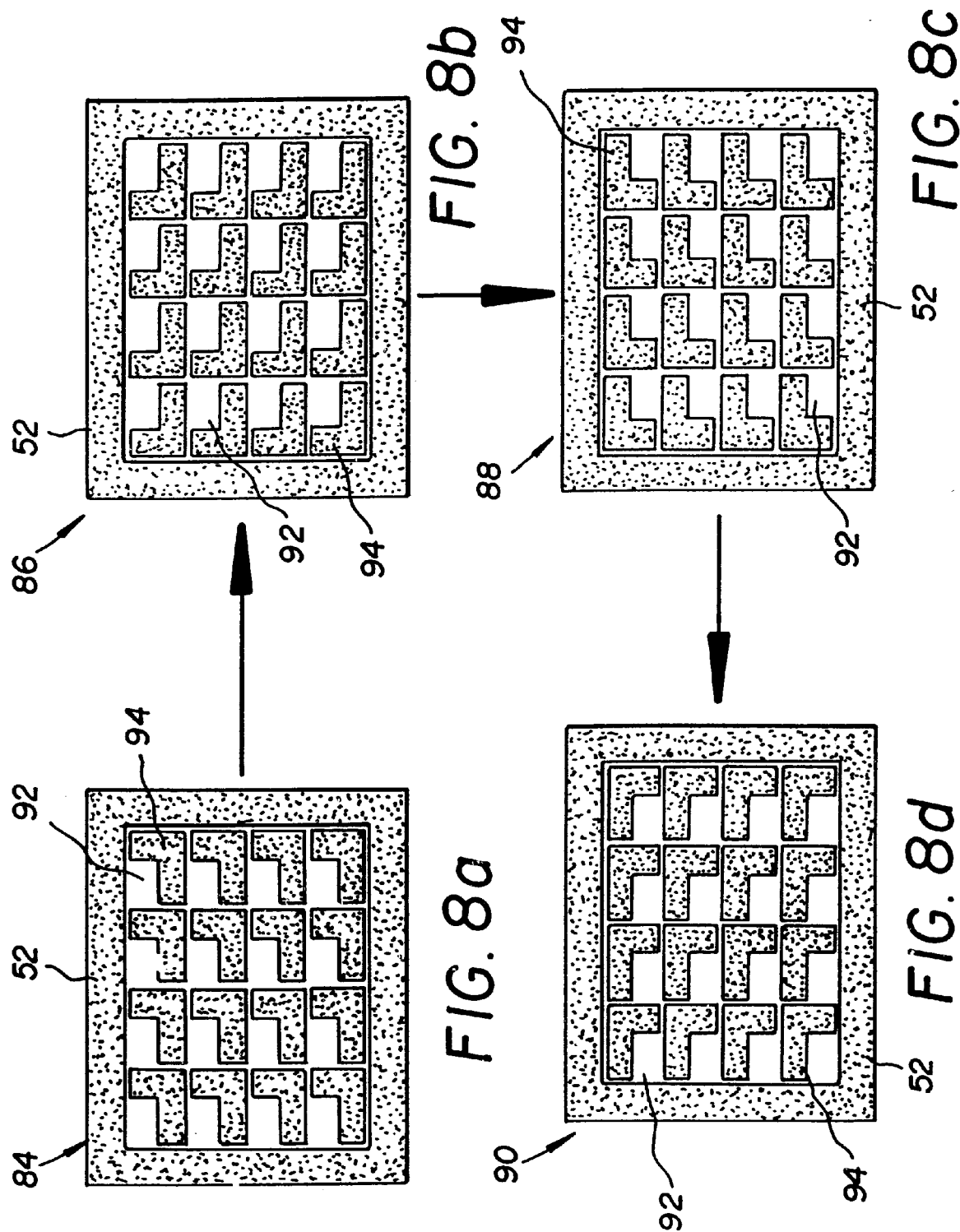

METHOD AND APPARATUS FOR PRINTING MONOCHROMATIC IMAGES USING A SPATIAL LIGHT MODULATOR HAVING A SELECTABLE LIGHT SOURCE

CROSS REFERENCE TO RELATED APPLICATIONS

Reference is made to commonly-assigned copending U.S. patent application Ser. No. 09/630,419, filed Aug. 1, 2000, entitled A METHOD AND APPARATUS FOR PRINTING MONOCHROMATIC IMAGING USING A SPATIAL LIGHT MODULATOR, by Wong et al., the disclosure of which are incorporated herein.

FIELD OF THE INVENTION

This invention relates generally to a method and apparatus for printing monochromatic imaging onto photosensitive media by spatially and temporally modulating a light beam, and more particularly to a film recording apparatus that allows selection of a light source of a preferred wavelength from among a set of available light sources having different wavelengths.

BACKGROUND OF THE INVENTION

Conventional printers generally adapted to record images provided from digital data onto photosensitive media apply light exposure energy that may originate from a number of different sources and may be modulated in a number of different ways. In photoprocessing apparatus, for example, light exposure energy can be applied from a CRT-based printer. In a CRT-based printer, the digital data is used to modulate a Cathode Ray Tube (CRT) which provides exposure energy by scanning an electron beam of variable intensity along its phosphorescent screen. Alternately, light exposure energy can be applied from a laser-based printer, as is disclosed in U.S. Pat. No. 4,728,965 (Kessler, et al.) In a laser-based printer, the digital data is used to modulate the duration of laser on-time or intensity as the beam is scanned by a rotating polygon onto the imaging plane.

CRT- and laser-based printers perform satisfactorily for photoprocessing applications, that is, for printing of photographs for consumer and commercial markets. However, in an effort to reduce cost and complexity, alternative technologies have been considered for use in photoprocessing printers. Among suitable candidate technologies under development are two-dimensional spatial light modulators.

Two-dimensional spatial light modulators, such as those using a digital micromirror device (DMD) from Texas Instruments, Dallas, Tex., or using a liquid crystal device (LCD) can be used to modulate an incoming optical beam for imaging. A spatial light modulator can be considered essentially as a two-dimensional array of light-valve elements, each element corresponding to an image pixel. Each array element is separately addressable and digitally controlled to modulate incident light from a light source by modulating the polarization state of the light. Polarization considerations are, therefore, important in the overall design of support optics for a spatial light modulator.

There are two basic types of spatial light modulators in current use. The first type developed was the transmissive spatial light modulator, which, as its name implies, operates by modulating an optical beam that is transmitted through individual array elements. The second type, a later development, is a reflective spatial light modulator. As its name implies, the reflective spatial light modulator operates by modulating a reflected optical beam through individual array elements. A suitable example of an LCD reflective spatial light modulator relevant to this application utilizes an integrated CMOS backplane, allowing a small footprint and improved uniformity characteristics.

Conventionally, LCD spatial light modulators have been developed and employed for digital projection systems for image display, such as is disclosed in U.S. Pat. No. 5,325,137 (Konno et al.) and in miniaturized image display apparatus suitable for mounting within a helmet or supported by eyeglasses, as is disclosed in U.S. Pat. No. 5,808,800 (Handschy et al.) LCD projector and display designs in use typically employ one or more spatial light modulators, such as using one for each of the primary colors, as is disclosed in U.S. Pat. No. 5,743,610 (Yajima et al.).

It is instructive to note that imaging requirements for projector and display use (as is typified in U.S. Pat. Nos. 5,325,137; 5,808,800; and 5,743,610) differ significantly from imaging requirements for printing. Projectors are optimized to provide maximum luminous flux to a screen, with secondary emphasis placed on characteristics important in printing, such as contrast and resolution. Optical systems for projector and display applications are designed for the response of the human eye, which, when viewing a display, is relatively insensitive to image artifacts and aberrations and to image non-uniformity, since the displayed image is continually refreshed and is viewed from a distance. However, when viewing printed output from a high-resolution printing system, the human eye is not nearly as "forgiving" to artifacts and aberrations and to non-uniformity, since irregularities in optical response are more readily visible and objectionable on printed output. For this reason, there can be considerable complexity in optical systems for providing a uniform exposure energy for printing. Even more significant are differences in resolution requirements. Adapted for the human eye, projection and display systems are optimized for viewing at typical resolutions such as 72 dpi or less, for example. Photographic printing apparatus, on the other hand, must achieve much higher resolution, particularly apparatus designed for micrographics applications, which can be expected to provide 8,000 dpi for some systems. Thus, while LCD spatial light modulators can be used in a range of imaging applications from projection and display to high-resolution printing, the requirements on supporting optics can vary significantly.

Largely because spatial light modulators can offer significant advantages in cost and size, these devices have been proposed for different printing systems, from line printing systems such as the printer depicted in U.S. Pat. No. 5,521,748 (Sarraf), to area printing systems such as the system described in U.S. Pat. No. 5,652,661 (Gallipeau et al.) One approach, using a Texas Instruments DMD as shown in U.S. Pat. No. 5,461,411 offers advantages common to spatial light modulator printing such as longer exposure times using light emitting diodes as a source as shown in U.S. Pat. No. 5,504,514. However, DMD technology is very specific and not widely available. As a result, DMDs may be expensive and not easily scaleable to higher resolution requirements. The currently available resolution using DMDs is not sufficient for all printing needs. Furthermore, there is no clear technology path to increased resolution with DMDs.

A preferred approach for photoprocessing printers uses an LCD-based spatial light modulator. Liquid crystal modulators can be a low cost solution for applications requiring spatial light modulators. Photographic printers using commonly available LCD technology are disclosed in U.S. Pat.

Nos. 5,652,661; 5,701,185 (Reiss et al.); and U.S. Pat. No. 5,745,156 (Federico et al.) Although the present application primarily addresses use of LCD spatial light modulators, references to LCD in the subsequent description can be generalized, for the most part, to other types of spatial light modulators, such as the DMD noted above.

Primarily because of their early development for and association with screen projection of digital images, spatial light modulators have largely been adapted for continuous tone (contone) color imaging applications. Unlike other digital printing devices, such as the CRT and laser-based devices mentioned above that scan a beam in a two-dimensional pattern, spatial light modulators image one complete frame at a time. Using an LCD, the total exposure duration and overall exposure energy supplied for a frame can be varied as necessary in order to achieve the desired image density and to control media reciprocity characteristics. Advantageously, for photoprocessing applications, the capability for timing and intensity control of each individual pixel allows an LCD printer to provide grayscale imaging.

Most printer designs using LCD technology employ the LCD as a transmissive spatial light modulator, such as is disclosed in U.S. Pat. Nos. 5,652,661 and 5,701,185. However, the improved size and performance characteristics of reflective LCD arrays have made this technology a desirable alternative for conventional color photographic printing, as is disclosed in commonly assigned, copending U.S. patent application Ser. No. 09/197,328, filed Nov. 19, 1998, entitled "Reflective Liquid Crystal Modulator Based Printing System" by Ramanujan et al. As is described in the Ramanujan application, color photographic printing requires multiple color light sources applied in sequential fashion. The supporting illumination optics are required to handle broadband light sources, including use of a broadband beamsplitter cube. The optics system for such a printer must provide telecentric illumination for color printing applications. In summary, in the evolution of photoprocessing systems for film printing, as outlined above, it can be seen that the contone imaging requirements for color imaging are suitably met by employing LCD spatial light modulators as a solution.

Printing systems for micrographics or Computer-Output-Microfilm (COM) imaging, diagnostic imaging, and other specialized monochrome imaging applications present a number of unique challenges for optical systems. In the COM environment, images are archived for long-term storage and retrievability. Unlike conventional color photographic images, microfilm archives, for example, are intended to last for hundreds years in some environments. This archival requirement has, in turn, driven a number of related requirements for image quality. For image reproduction quality, for example, one of the key expectations for micrographics applications is that all images stored on archival media will be written as high-contrast black and white images. Color film is not used as a medium for COM applications since it degrades much too quickly for archive purposes and is not capable of providing the needed resolution. Grayscale representation, meanwhile, has not been available for conventional micrographics printers. Certainly, bitonal representation is appropriate for storage of alphanumeric characters and for standard types of line drawings such as those used in engineering and utilities environments, for example. In order to record bitonal images onto photosensitive media, exposure energy applied by the printer is either on or off, to create high-contrast images without intermediate levels or grayscale representation.

In addition to the requirement for superb contrast is the requirement for high resolution of COM output. COM images, for example, are routinely printed onto media at reductions of 40× or more. Overall, micrographics media is designed to provide much higher resolution than conventional dye-based media provides for color photographic imaging. To provide high resolution, micrographics media employs a much smaller AgX grain size in its photosensitive emulsion. Optics components for COM systems are correspondingly designed to maximize resolution, more so than with optical components designed for conventional color photoprocessing apparatus.

Conventional COM printers have utilized both CRT-and laser-based imaging optics with some success. However, there is room for improvement. For example, CRT-based printers for COM use, such as disclosed in U.S. Pat. No. 4,624,558 (Johnson) are relatively costly and can be bulky. Laser-based printers, such as disclosed in U.S. Pat. No. 4,777,514 (Theer et al.) present size and cost constraints and can be mechanically more complex, since the laser imaging system with its spinning polygon and beam-shaping optics must be designed specifically for the printer application. In addition, laser printers exhibit high-intensity reciprocity failure when used with conventional photosensitive media, thus necessitating the design of special media for COM use.

More recent technologies employed for COM imaging include use of linear arrays such as linear light-emitting diode (LED) arrays, for example, as are used in the Model 4800 Document Archive Writer, manufactured by Eastman Kodak Company, Rochester, N.Y. Another alternative is use of a linear light-valve array, such as is disclosed in U.S. Pat. No. 5,030,970 (Rau et al.) However, with exposure printheads using linear arrays, COM writers continue to be relatively expensive, largely due to the cost of support components and to the complexity of drive electronics. There is a long-felt need to lower cost and reduce size and complexity for COM devices, without sacrificing performance or robustness.

A well-known shortcoming of conventional COM printers relates to the interdependence between COM printer design and the exposure sensitivity characteristics of a specific photosensitive media type. Currently, a particular type of COM printer is designed to write only on a single type of COM media. Conversely, a single type of COM media can only be used in a particular type of COM printer. The exposure optics of a particular type of COM printer are designed to apply specific levels of exposure energy over a specific range of wavelengths to the COM media. Because of this constraint, a customer who purchases a COM printer of specific manufacture and model type can use that COM printer only with COM media that has been developed specifically for that printer, or with a very limited number of other types of media having similar characteristics. This is true even though the same media handling subsystem used in the COM printer could be capable of routing different types of photosensitive media from a film supply, through an exposure section, and to a film processing or film storage unit for exposed media.

Exposure wavelength is one important characteristic that constrains COM printer use to a specific media. Existing COM printers use monochromatic light as the source of exposure energy. Different COM media are designed for optimum performance with monochromatic exposure light at different wavelengths. For example, the KODAK Archive Storage Media 3459 is optimized for exposure wavelengths near 685 nm. KODAK IMAGELINK DL Microfilm, on the other hand, is designed for optimal sensitivity when exposed at 633 nm.

This interdependence of COM printer and COM media characteristics is disadvantageous from a number of perspectives. Development of an improved COM printer can be constrained by the requirement that exposure optics provide only a specific output wavelength. Development and marketing of an improved COM film can be constrained either by the requirement that the COM film be used at exposure wavelengths available with existing COM printers or by the requirement that a new COM printer be developed, in order to provide exposure energy at the proper wavelength. These constraints add cost to the production of both COM media and COM printing apparatus and limit the flexibility of COM customers to use a preferred printer or media type for a given situation.

Conventional COM printing apparatus can be adjusted somewhat for slight media sensitivity variation, but such routine adjustments are made only in order to adapt to anticipated batch-to-batch media variability over a narrow range. For this purpose, Calibration Look-Up Tables (LUTs) are used with some systems to adjust exposure characteristics (exposure time and intensity) to compensate for slight drift (such as might be due to media aging) or batch sensitivity differences. However, this type of solution would not be suitable for handling different media types having different wavelength sensitivity. Even though intensity and timing of exposure energy can be adjusted, these exposure factors cannot adequately compensate for media wavelength sensitivity differences over more than a narrow range without having an objectionable impact on image quality.

Conventional exposure optics systems are limited to the use of a single type of exposure light source. Depending on the type of light source used, it can be possible to provide exposure light at different wavelengths. For example, where the exposure light source is a halogen bulb, it would be possible to provide interchangeable filters arranged to allow selection from among multiple exposure wavelengths, depending on the choice of filter. However, such a solution would require manual insertion of a filter element or, if automated, moving parts for positioning a filter in the light path. It could also be possible to provide multiple lasers, for example, and allow an operator-initiated or automated selection of a specific laser in the exposure optics path for a particular COM media. However, such a solution requires expensive components and would not allow compact packaging without introducing a significant amount of mechanical complexity. Any practical solution for providing a selectable exposure wavelength must meet the goals of low-cost, compact packaging, and mechanical simplicity that would not be provided by conventional COM light sources. Furthermore, where possible, automated mechanisms would be preferred over manual methods for adapting a COM printer to a specific COM media.

Thus, it can be seen that there is a need for an improved COM printing apparatus that is inexpensive, compact, and robust, that allows the use of alternate types of COM media where the COM media have different exposure characteristics and that allows automated sensing and response to the type of COM media loaded.

SUMMARY OF THE INVENTION

It is an object of the present invention to provide a printing apparatus using a spatial light modulator for imaging onto photosensitive media, wherein the printing apparatus is capable of using any one of a number of possible monochromatic light sources.

According to one aspect of the present invention an apparatus prints monochrome images from digital image data onto a selected photosensitive medium that is selected from a plurality of photosensitive media compatible with the monochrome printing apparatus. A light source, which is selectable, selects from a plurality of light source elements a monochromatic light source that is suited to the selected photosensitive medium. A uniformizer uniformizes the light that is emitted from the monochromatic light source. A polarizer for filtering the uniformize light provides a polarized beam having a predetermined polarization state. A spatial light modulator has a plurality of individual elements capable of altering the polarization state of the polarized beam to provide an exposure beam for printing, the state of the elements controlled according to the digital image data. A first lens assembly directs the polarized beam to the spatial light modulator and a second lens assembly directs the exposure beam onto the selected photosensitive medium.

According to one embodiment of the present invention, any one of a set of monochromatic light source elements can be selectively energized as the light source for exposing the photosensitive media. The monochromatic exposure light is passed through a uniformizer or integrator to provide a source of spatially uniform, monochromatic light for the printing apparatus. The monochromatic light is then polarized and passed through a beamsplitter, which directs a polarized beam onto a spatial light modulator. Individual array elements of the spatial light modulator, controlled according to digital image data, are turned on or off in order to modulate the polarization rotation of the incident light. Modulation for each pixel can be effected by controlling the level of the light from the light source, by control of the drive voltage to each individual pixel in the spatial light modulator, or by controlling the duration of on-time for each individual array element. The resulting light is then directed through a lens assembly to expose the photosensitive medium.

According to a preferred embodiment of the present invention, the plurality of monochromatic light sources is made available by the use of an array of LEDs, wherein different groupings of LEDs within the array can be selectively energized to provide optical exposure energy at different wavelengths.

An advantage of the present invention is that it allows a single monochrome printing apparatus to be able to use a range of media types, where the media types differ in sensitivity to exposure wavelength. This allows an existing printing apparatus to take advantage of new media types as well as improvements in media performance. Conversely, this allows a new printing apparatus to be designed to use both newly introduced and existing media types.

A further advantage of the present invention is that it allows the development of lower cost photosensitive media by allowing variability over the range of exposure wavelengths used for imaging.

A further advantage of the present invention is that it can provide wavelength selectivity without introducing any moving part and without appreciably increasing the cost, size, or mechanical complexity of the printer.

A further advantage of the present invention is that it provides a mechanism for automatically selecting an appropriate light source, based on detecting the type of media loaded in the printing apparatus, thus eliminating operator interaction and possible operator error.

These and other objects, features, and advantages of the present invention will become apparent to those skilled in the art upon a reading of the following detailed description when taken in conjunction with the drawings wherein there are shown and described illustrative embodiments of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIGS. 5a–5d illustrate the effect of dithering an un-apertured spatial light modulator using four distinct image positions;

FIGS. 8a–8d illustrate the effect of dithering an apertured spatial light modulator using four distinct image positions;

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

It must be noted that the following description focuses on monochromatic printers used in micrographic COM applications. However, the apparatus and method disclosed herein could be used with other types of monochromatic digital printing apparatus, such as diagnostic imaging devices, for example.

Figure 1:
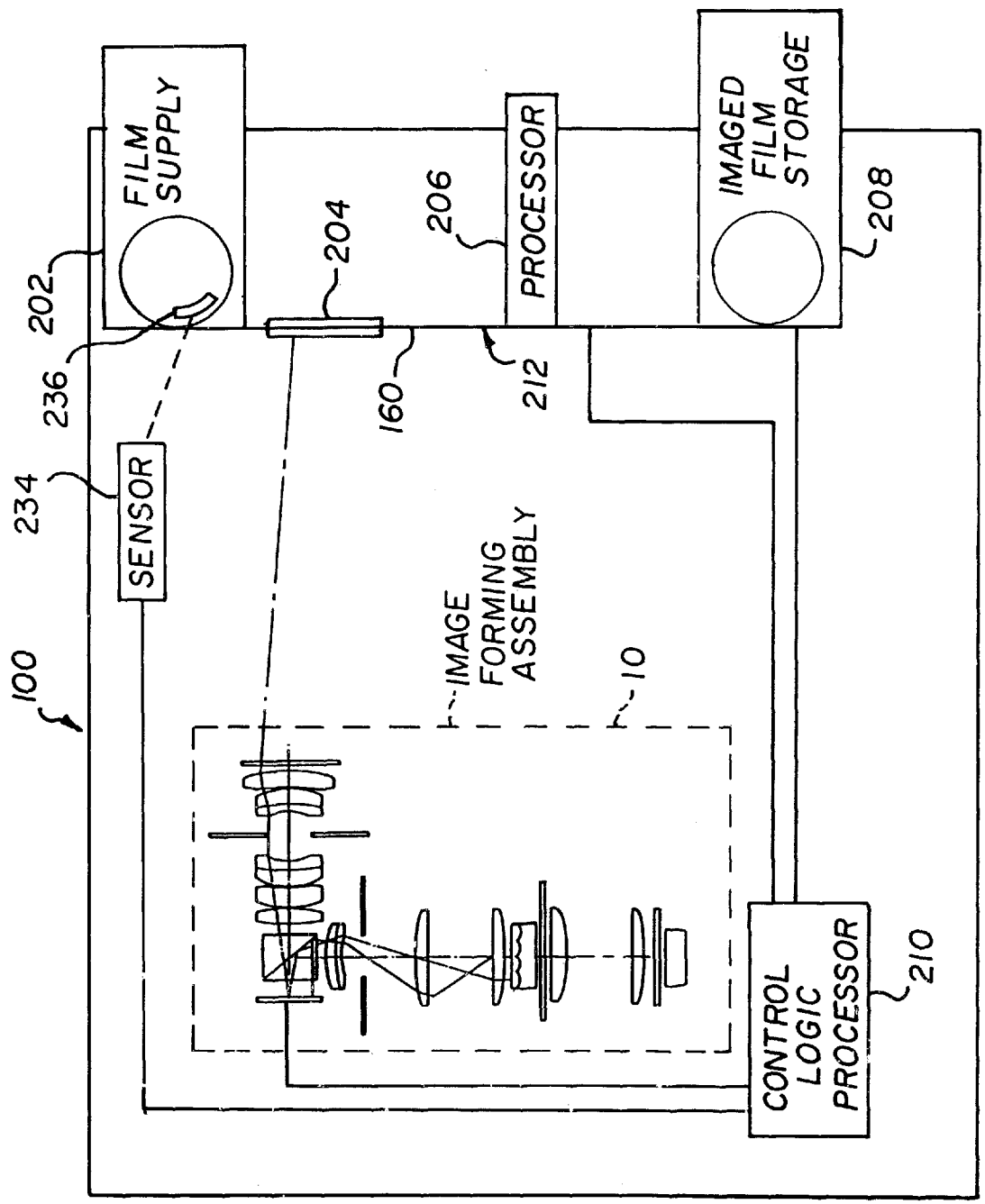
FIG. 1 is a schematic view showing a printing apparatus according to the present invention.

Referring now to the drawings, wherein like reference numerals represent identical or corresponding parts throughout the several views, FIG. 1 illustrates an archival printer, such as a COM printer, referred to in general by numeral 100. Printer 100 comprises an image forming assembly 10 and a media handling subsystem 212. Media handling subsystem 212 comprises a film supply 202, an exposure section 204, an optional film processor 206, and a film storage unit 208. A control logic processor 210 accepts and processes image data for printer 100 and controls the overall operation of image forming assembly 10 and media handling subsystem 212 components. The operation of printer 100 is straightforward, following the general pattern used for COM printers overall. To print, an undeveloped section of a photosensitive media 160 is advanced from film supply 202 into exposure section 204. Image forming assembly 10 cooperates with control logic processor 210 to print image data onto photosensitive media 160. The exposed section of photosensitive media 160 is then ready for processing in order to develop the image. In one embodiment, in which printer 100 uses dry-processed media, film processor 206 may be built into printer 100 itself, as is represented in FIG. 1. The exposed section of photosensitive media 160 is advanced to film processor 206, where the latent exposed image is developed using a heat process. For printer 100 designed for aqueous (AgX) media, the image development function of film processor 206 is carried out by a separate developing apparatus (not shown), using conventional silver-halide film development chemicals and techniques. For printer 100 using aqueous media, film storage unit 208 is typically a cassette, designed to keep the exposed photosensitive media 160 protected from ambient light and to provide a means for transfer of photosensitive media 160 to the separate developing apparatus.

Figure 2:
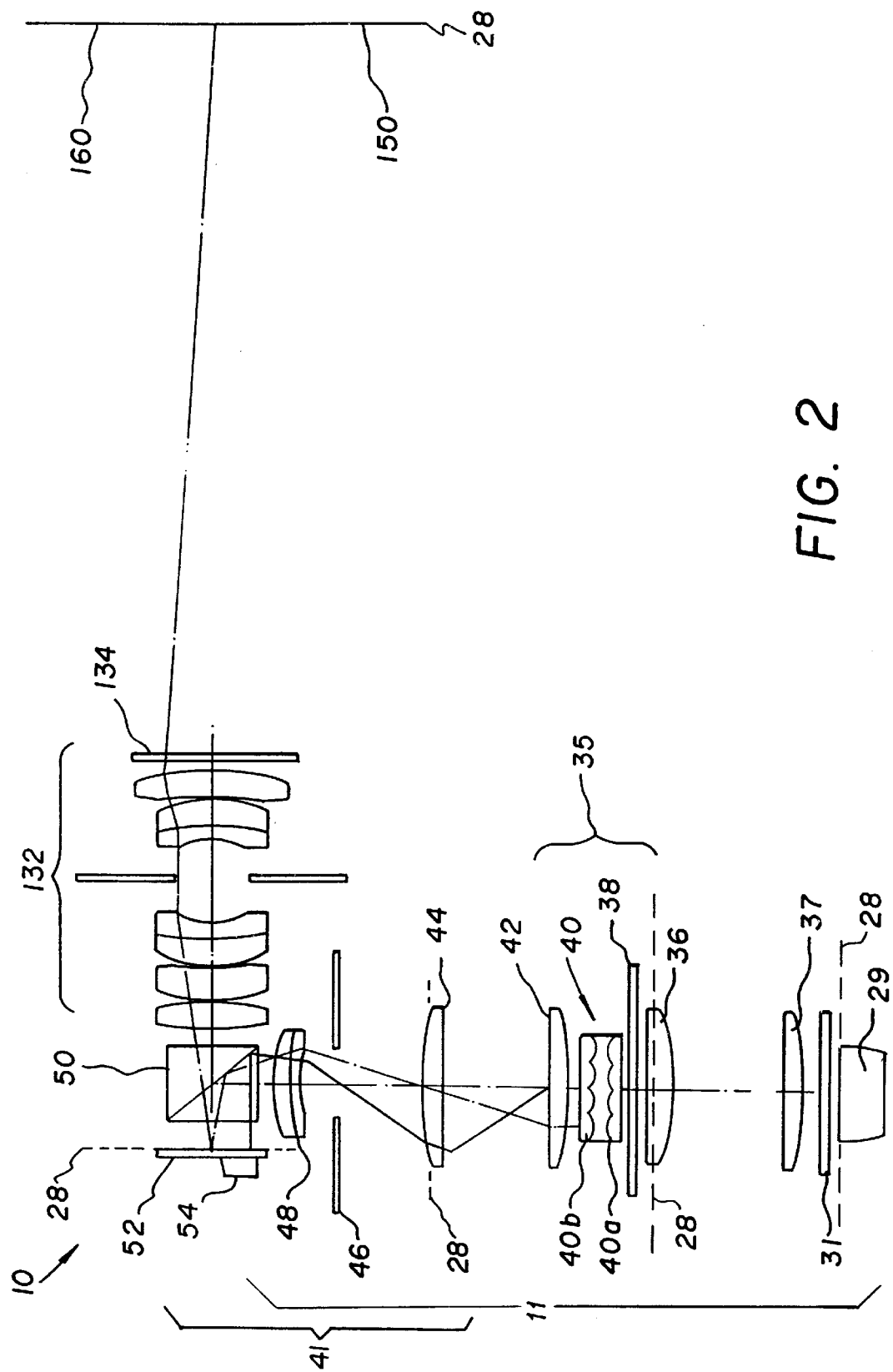
FIG. 2 is a schematic view showing Image forming assembly components for a printing apparatus according to the present invention.

Referring to FIG. 2, there is shown image forming assembly 10 which comprises illumination optics 11. Illumination optics 11 comprises a light source 29 which is selectable and can be implemented using a number of types of lamp or electro-optical components, as is described subsequently. If light source 29 comprises a halogen lamp, it is advisable to incorporate an infrared rejecting filter 31 following the lamp in the assembly, as shown in FIG. 2. Light emitted from light source 29 is focused by a lens 37 and directed to an uniformizer 35.

Uniformizer 35 comprises two field lenses 36 and 42 and a lenslet array assembly 40, acting as an uniformizer for the light. Lenslet array assembly 40 includes two lenslet arrays 40a and 40b. Lenses 36 and 37 direct the monochromatic light into the entrance aperture of lenslet array assembly 40. Conjugate planes within image forming assembly 10 are indicated by dotted lines 28.

The light at the intermediate illumination plane is broken into a number of portions equivalent to the number of elements in lenslet array 40a. The individual portions are then imaged and magnified by second lenslet array 40b and second field lens 42. Light passing through uniformizer 35 along with a following field lens 44 is passed through an optional aperture stop 46 and a relay lens 48. Relay lens 48 is positioned immediately before a polarization beamsplitter element 50. It should also be noted that, although relay lens 48 and field lens 44 are shown as separate elements in FIG. 2, a single compound lens 49 (not shown) providing uniform illumination could be employed instead of the two individual lens elements 48 and 44 as is depicted in FIG. 2.

Because polarization beamsplitter element 50 may not provide adequate extinction between s polarization state of light 142 (not shown) and p polarization state of light 144 (not shown), an optional linear polarizer 38 may be incorporated prior to polarization beamsplitter element 50. There are several places where a linear polarizer 38 can be placed; one such position is immediately preceding lenslet array assembly 40. Linear polarizer 38 is used to isolate the polarization state parallel to the axis of polarization beamsplitter element 50. This serves to reinforce the polarization state determined by polarization beamsplitter element 50, decrease leakage light and thereby increase the resulting contrast ratio. Referring again to FIG. 2, light of the s-polarization state 142 passing through polarization beamsplitter element 50 is directed to the plane of a reflective spatial light modulator 52, which is a reflective LCD in the preferred embodiment. The p-polarization state 144 is passed through polarization beamsplitter element 50. Field lens 44, relay lens 48, and the polarization beamsplitter element 50 constitute the first lens assembly 41 for directing the polarized light to the spatial light modulator 52.

Figure 3:
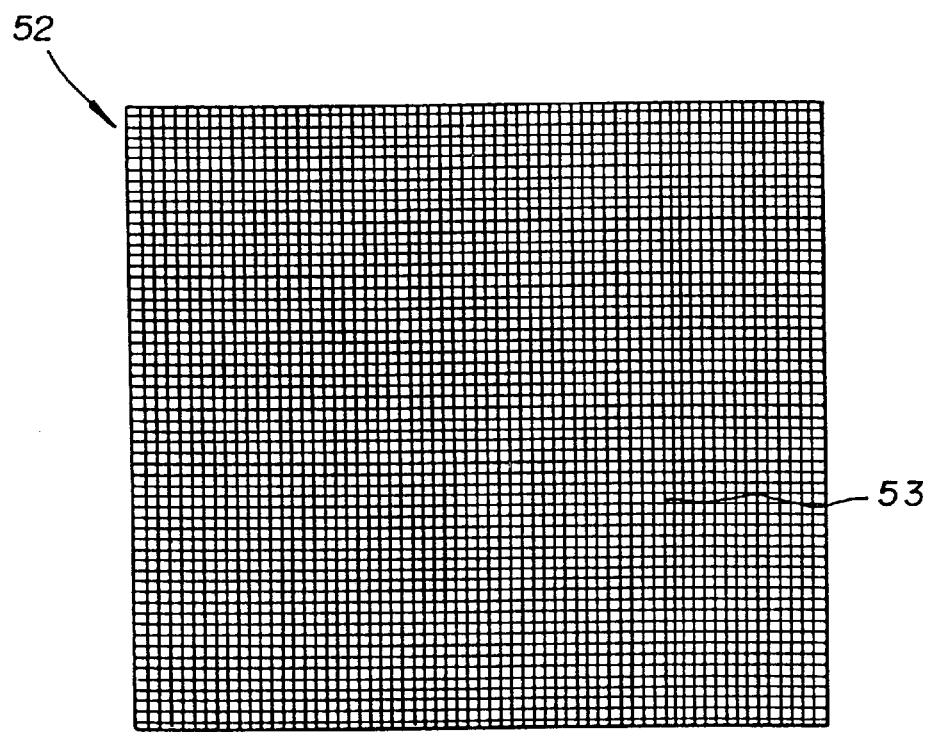
FIG. 3 is a plan view that illustrates a front surface of a multiple site spatial light modulator.

Referring to FIG. 3, spatial light modulator 52 of this system is designed for a two dimensional reflective polarization-based spatial light modulator. Spatial light modulator 52 includes a plurality of modulator sites 53, each of which can be individually modulated. Light passes through spatial light modulator 52, is reflected off the back reflective surface of spatial light modulator 52, and returns through spatial light modulator 52 to be directed through a second lens assembly 132, which is a print lens assembly, onto an image plane 150 (FIG. 2). If a modulator site 53 is "on" or bright, during the round-trip through spatial light modulator 52, the polarization state of the light is rotated. In an ideal case the light is rotated 90 degrees when modulator site 53 is in an "on" state. However, this ideal degree of rotation is rarely easily achieved. If a given modulator site is "off" or dark, the light is not rotated. The light that is not rotated is not passed straight through polarization beamsplitter element 50 but is redirected away from the media plane by polarization beamsplitter element 50. It should be noted that light which is rotated by spatial light modulator 52 may become elliptically polarized. Upon passing through a linear polarizer, the light will regain linearity. However, light that is not passed through a linear polarizer will retain ellipticity.

As noted above, the most readily available choice of reflective polarization based modulators is the reflective liquid crystal modulator. Such modulators, originally developed for use in projection display, can have resolutions as high as 4000×2000 modulator sites. Currently, resolutions of 1200×1600 sites are available with footprints as small as a 0.9 inch diagonal. These high resolution reflective LCDs are often twisted nematic LCDs or homeotropically aligned reflective LCDs, although other types of reflective LCDs such as ferroelectric are often employed in projection display. Some of the key characteristics of these LCDs are high resolution, high contrast (>100:1), fast frame rate of 70 frames per second or higher, and high aperture ratios (>90%). In addition, the incorporation of a CMOS backplane increases the uniformity across the array. The LCDs are also capable of producing an eight bit gray scale either through pulse width modulation or through analog operation. In either case data is introduced digitally to the printing system, as controlled by control logic processor 210 (FIG. 1). These characteristics ensure that the reflective LCD is an excellent choice for use in a reflective printing system.

Spatial light modulator 52 can be designed in a number of different configurations. The most amenable to a low cost printing system is a single chip system. In a preferred embodiment, spatial light modulator 52 would be a single-chip device specifically designed for single color use, providing optimum frame speed.

In accordance with this invention, the light source could have a number of selectable wavelengths. It is thus necessary to use the spatial light modulator 52 with light at a wavelength for which the modulator is not optimized. In such a case, there are methods for obtaining optimum performance. For example, for a given liquid crystal composition, thickness, and applied voltage, the resulting polarization rotation on an incident beam may vary with wavelength so that the efficiency and contrast of the modulation can vary as a function of wavelength. In the bright, or "on" state, this difference in rotation can effect the efficiency of the system. In other words, the percentage of incident light that is actually rotated and imaged on the media plane can vary. This difference in wavelength efficiency can be accounted for by adapting the illumination strength and exposure time, based on wavelength, in order to obtain the power density required by the media, using techniques well-known in the imaging art. The problem is particularly acute in the dark or "off state". In this state, the light is not rotated and should not be directed through polarization beamsplitter element 50 and imaged. If the light is in fact, rotated, light will leak through the imaging system and decrease the contrast.

Figure 4:
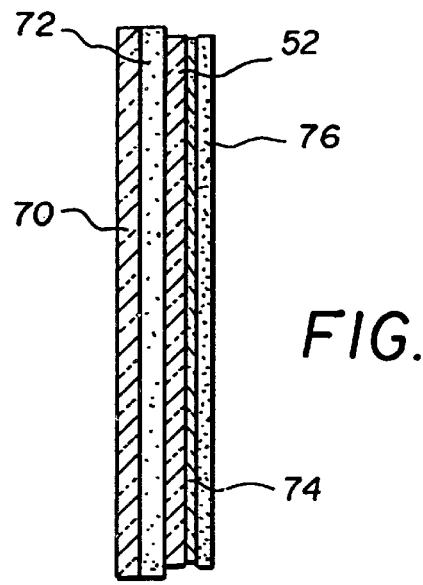
FIG. 4 shows a cross-section of a reflective modulator with motion controllers, a liquid crystal spatial light modulator, a cover glass, and a polarization compensation component.

In an alternate embodiment, contrast can be adjusted for wavelength using polarization compensation or selection devices. Referring to FIG. 4, in which a cross-sectional view of spatial light modulator 52 is shown, a polarization compensator 76 may be introduced to the surface of spatial light modulator 52. As shown in FIG. 4, the top surface or layer includes polarization compensator 76, the second surface or layer is a cover glass 74 of spatial light modulator 52, the third layer is spatial light modulator 52 itself, with a reflective backplane. Behind spatial light modulator 52 are mounted actuators 70, 72 or mounts for actuators to position spatial light modulator 52.

An alternate method for contrast adjustment is to incorporate a polarization compensator in the path of the optical beam to correct the polarization state of the light. A single compensator may be placed in the optical path to particularly correct the off-state of the light. However, polarization compensation devices can be expensive. An efficient but inexpensive means to accomplish the same results can be obtained using linear polarizers. As was mentioned earlier, a single LCD imparts a degree of polarization rotation dependent on the color of illumination. In an effort to maximize contrast, special care must be taken to provide a truly dark "off state." Because the rotation of the light from spatial light modulator 52 is not always crossed perfectly with polarization beamsplitter element 50 in the off state, additional polarization selection must be incorporated into the optical path. Also, polarization beamsplitter element 50 is not perfect and will leak some amount of light. For these reasons, an additional sheet polarizer can be disposed either immediately before or after print lens assembly 132. This additional polarizer serves to reject leakage light that is passed through polarization beamsplitter element 50. Specifically, for a particular LCD modulator, the dark state of the light is actually rotated 7 degrees from the polarization transmitting direction of polarization beamsplitter element 50. To correct this in the preferred embodiment, a second polarizer 134 (FIG. 2) is provided, rotated 7 degrees off-axis to suppress leakage light. The particular angle at which polarizer 134 must be placed is a function of the particular reflective LCD chosen for the printing system and the light source selected. A suggested placement of polarizer 134 in the optics path is shown in FIG. 2.

Dithering

In an alternative embodiment of printer 100, dithering may be used to increase the inherent LCD resolution and to compensate for modulator site defects. A dithering pattern for a standard high aperture ratio spatial light modulator 52 is shown in FIGS. 5a–5d.

To dither a full aperture LCD is to image the spatial light modulator 52 at one position, and reposition spatial light modulator 52 a fraction of a modulator site distance away and image. In so doing, multiple images are created and overlapped. By overlapping multiple images, the system acquires a redundancy that corrects for modulator site failure or drop out. Furthermore, by interpolating and updating the data between positions, the effective resolution is increased. Referring to the example dithering scheme depicted in FIGS. 5a–5d, spatial light modulator 52 is first positioned at a first modulator position 61 and modulator sites 63 are positioned and imaged (FIG. 5a). Spatial light modulator 52 is then moved to a second modulator position 62 (FIG. 5b) which is one half of a modulator site laterally displaced from previous position 61. Spatial light modulator 52 is then imaged at position 62. Spatial light modulator 52 is then displaced one half of a modulator site longitudinally from previous position 62, which means it is diagonally displaced from initial position 61 to a third modulator position 64 (FIG. 5d). Modulator sites 63 are illuminated and the media exposed again. Spatial light modulator 52 is then moved to a fourth modulator position 65 that is laterally displaced from third position 64 (FIG. 5c). The media is then exposed at this position. Using this pattern, there is effectively a fourfold increase in the amount of data written. This serves to increase image resolution and provide means to further sharpen images. Alternately, with a high aperture ratio, it may be sufficient to simply dither in one diagonal direction (that is, for example, from first position 61 shown in FIG. 5a to third position 64 shown in FIG. 5d) in order to achieve suitable results.

Dithering requires motion of the modulator in two directions. Each increment of motion is approximately between 5 um and 20 um for a typical reflective LCD modulator. In order to achieve this incremental motion, many different actuator 54 or motion assemblies, as shown in FIG. 2, can be employed. For example, the assembly can use two piezo-electric actuators.

Figure 6:
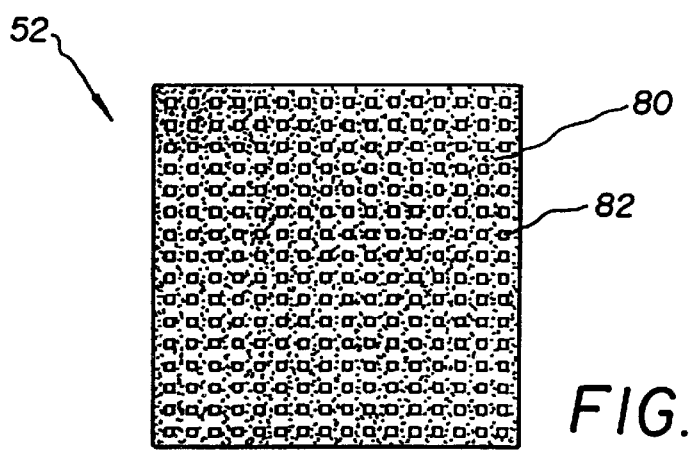
FIG. 6 is a plan view that illustrates a front surface of a sub-apertured spatial light modulator.

In an alternate embodiment for dithering, requiring minimum modification to a reflective LCD device designed for projection display, the device can be sub-apertured. In an effort to markedly increase resolution, the modulator can contain an aperture ratio that is relatively small. Ideally this aperture must be symmetrically placed within each modulator site. The result is a modulator site for which only a fraction of the area transmits light. Referring to FIG. 6, there is shown an illustration of a sub-apertured area modulator. Black regions 80 represent the non reflecting, non-transmitting regions of the device. Clear areas 82 represent the sub-apertured transmitting areas of the LCD.

Figure 7:
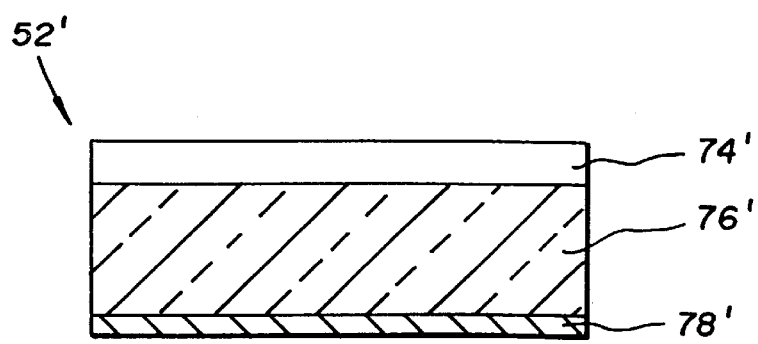
FIG. 7 is a cross-sectional view of a reflective spatial light modulator.

FIG. 7 is a cross-sectional view of an alternate two-dimensional LCD spatial light modulator 52'. There is a frame 78' which can be in the form of a CMOS backplane on top of which rests an LCD 76'. Above the LCD 76' is a cover glass 74'. Sub-apertures, to effect the pattern of FIG. 6, may exist as a mask in frame 78', as a pattern in LCD 76', or as a pattern on the surface of cover glass 74' closest to LCD 76'. In an effort to double the resolution in each direction, a sub-aperture of approximately 25% may be employed. By dithering a 25% aperture ratio device, it is possible to double the resolution in the image.

FIGS. 8a–8d represent the dithering of a sub-apertured device. Spatial light modulator 52 is positioned at a first modulator position 84 (FIG. 8a) and sub-apertured modulator sites 92 are positioned and exposed while darkened (non reflecting) regions 94 are not imaged onto photosensitive media 160. Spatial light modulator 52 is moved to a second modulator position 86 (FIG. 8b) a half full modulator site (sub-aperture and surrounding non-reflective area) laterally displaced from previous position 84. Spatial light modulator 52 is then exposed at position 86. Spatial light modulator 52 is then displaced a half a full modulator site longitudinally from previous position 86 to third modulator position 88 (FIG. 8c), which means it is diagonally displaced from the starting point at first modulator position 84. Spatial light modulator 52 is then illuminated and the media exposed again. Spatial light modulator 52 is then moved to a fourth modulator position 90 (FIG. 8d) that is laterally displaced from third position 88. The media is exposed at this position. Effectively, there is a four times increase in the amount of data written. This serves to increase image resolution and to provide means for further image sharpening. A sub-aperture of 25% by area, as approximated in FIG. 6, will give the highest image quality for a four step dither, however, in an effort to allow for redundancy in the modulator sites, it is better to use a sub-aperture ratio of greater than 25% by area.

When the sub-apertures are not placed symmetrically within each cell, dithering becomes quite difficult. Different periods of motion can be employed; for instance, one full modulator site width lateral motion combined with half a modulator site vertical motion makes a dither pattern. However, such motion is quite prone to image artifacts. A simple way to get around this problem is to dither using only odd columns, then repeat the dither using only even columns. Alternately, the dither algorithm may follow another pattern, dithering even rows, then dithering odd rows, for example.

Figure 9:
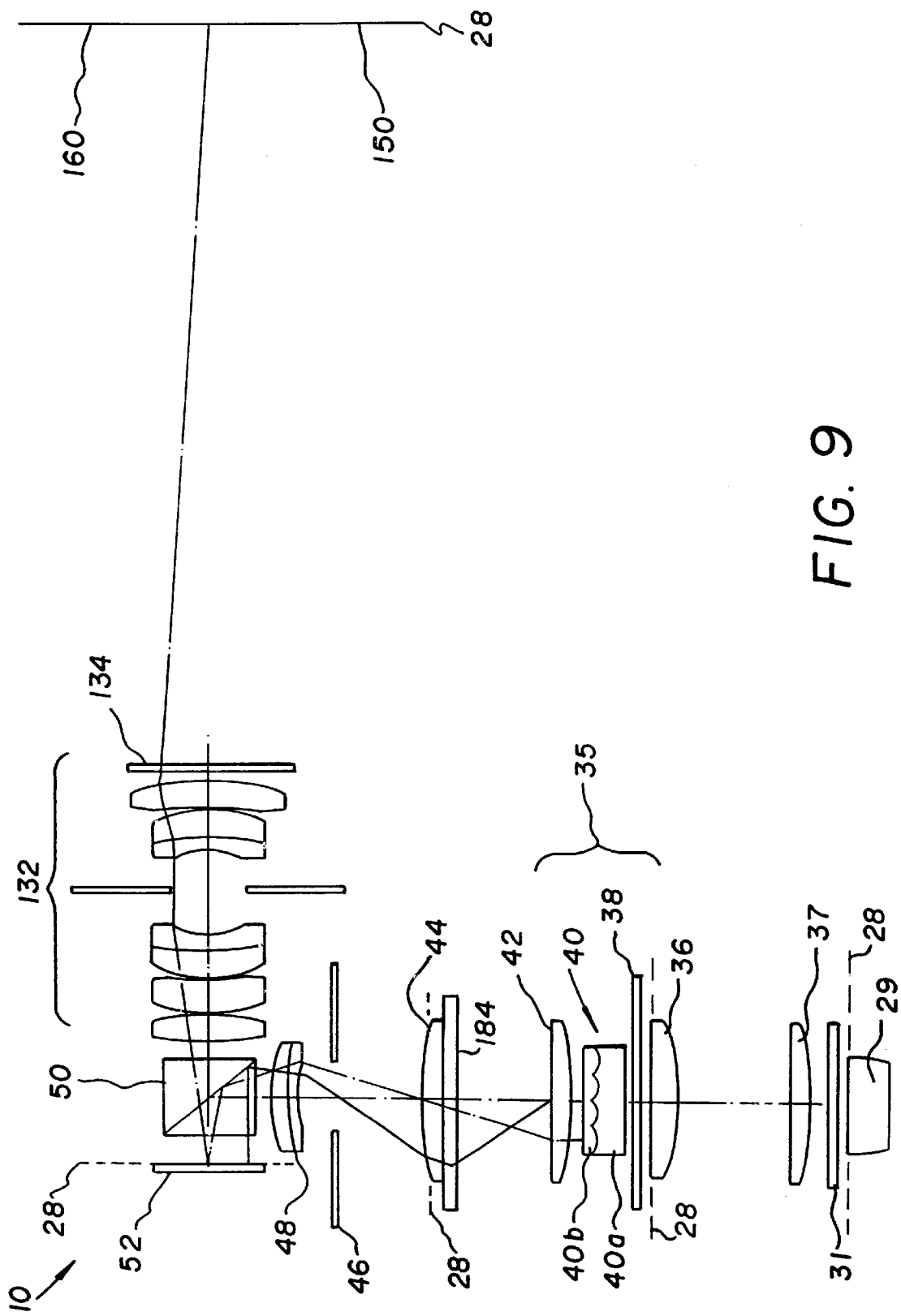
FIG. 9 is a schematic view showing Image forming assembly components for a printing apparatus according to the present invention, including an intermediate image plane for inclusion of a dither mask.

In an alternate embodiment, spatial light modulator 52 is left undithered. But, dithering takes place in one of conjugate image planes 28 as is shown in FIG. 9. In this conjugate plane 28 a mask 184 containing the sub-aperture is placed. It is mask 184 that is dithered while the information content to the modulator sites at spatial light modulator 52 is updated. This allows a sub-apertured image to be recorded although the device may not be sub-apertured. It is also possible to create an intermediate image plane, however, this will prove cumbersome.

Another means by which to accomplish the dithering through the use of mask 184 is to place mask 184 in the image plane immediately before photosensitive media 160. This mask 184 can then be dithered while data is refreshed to the device between dither positions. This method of dither will accomplish the same effect as the previous method of the intermediate image.

Following spatial light modulator 52 and polarization beamsplitter element 50 in FIG. 1 is a print lens assembly 132. Print lens assembly 132 provides the correct demagnification of the image of spatial light modulator 52 to image plane 150 where photosensitive media 160 is located. It should be noted that print lens assembly 132 can be configured for reduction (as is needed for micrographics) or for magnification (as is needed for diagnostic imaging). The configuration of print lens assembly 132 components is dependent on how printer 100 is used. With this arrangement, the same illumination optics 11 and spatial light modulator 52 components can be used with different printer 100 types.

The optical system designed using the arrangement disclosed in FIG. 1 has been shown to be compact, low in cost, and efficient. The combination shown in FIG. 1, using a high intensity light source 29 and supporting illumination optics 11 with a reflective LCD spatial light modulator 52 and print lens assembly 132 optics optimized for COM-quality reduction, provides high levels of exposure energy suited to the resolution and contrast requirements of the micrographics environment. Moreover, because image forming assembly 10 is capable of providing high exposure energy, image forming assembly 10 allows printer 100 to use dry-process media when provided with a light source having sufficient power and wavelength characteristics, thereby providing performance and environmental benefits.

Achieving Grayscale Output

Printer 100 is capable of achieving sufficient uniformity while retaining the grayscale performance. Spatial light modulator 52 alone can receive up to 8 bits of bit depth. However, 8 bits to the modulator may not translate to 8 bits at the media. Furthermore, LCD modulators are known to exhibit some measure of roll-off or loss of contrast at the edges of the device. To print an adequate grayscale range and provide additional bit depth, the present invention can take advantage of the fact that spatial light modulator 52 designed for projection display generally refresh data faster than is required for printing. Consequently, it is possible to create a single image at the photosensitive media 160 as a super-position of a series of images. The individual images that comprise the final image can vary both in information content and illumination.

It is possible to maintain the same image data at spatial light modulator 52 and, by altering the illumination level from light source 29, introduce additional bit depth. By varying the illumination level, (and/or duration), and by altering the data content controlling spatial light modulator 52, printer 100 can build a composite image out of a series of preliminary images. The superposition of the images of varied information content and varied illumination level introduces additional bit depth to the composite image.

Non-uniformity Compensation

Using the present invention, printer 100 can control image forming assembly 10 to correct for some non-uniformity such as roll-off at spatial light modulator 52 edges. One way to accomplish this is to introduce additional image data to spatial light modulator 52, activating only individual modulator sites 53 on the outer edge of spatial light modulator 52. These added images can then be exposed and superimposed on the other images thus giving additional depth to the edge regions. An example method would be to scan a series of images taken at LCD spatial light modulator 52, create data maps and convolve all input data with an initial map of LCD spatial light modulator 52 to correct the image. Similar techniques can be used to adjust for modulator non-uniformities that are known prior to operation.

Alternative Embodiments for Image Forming Assembly 10 Components

Figure 10:
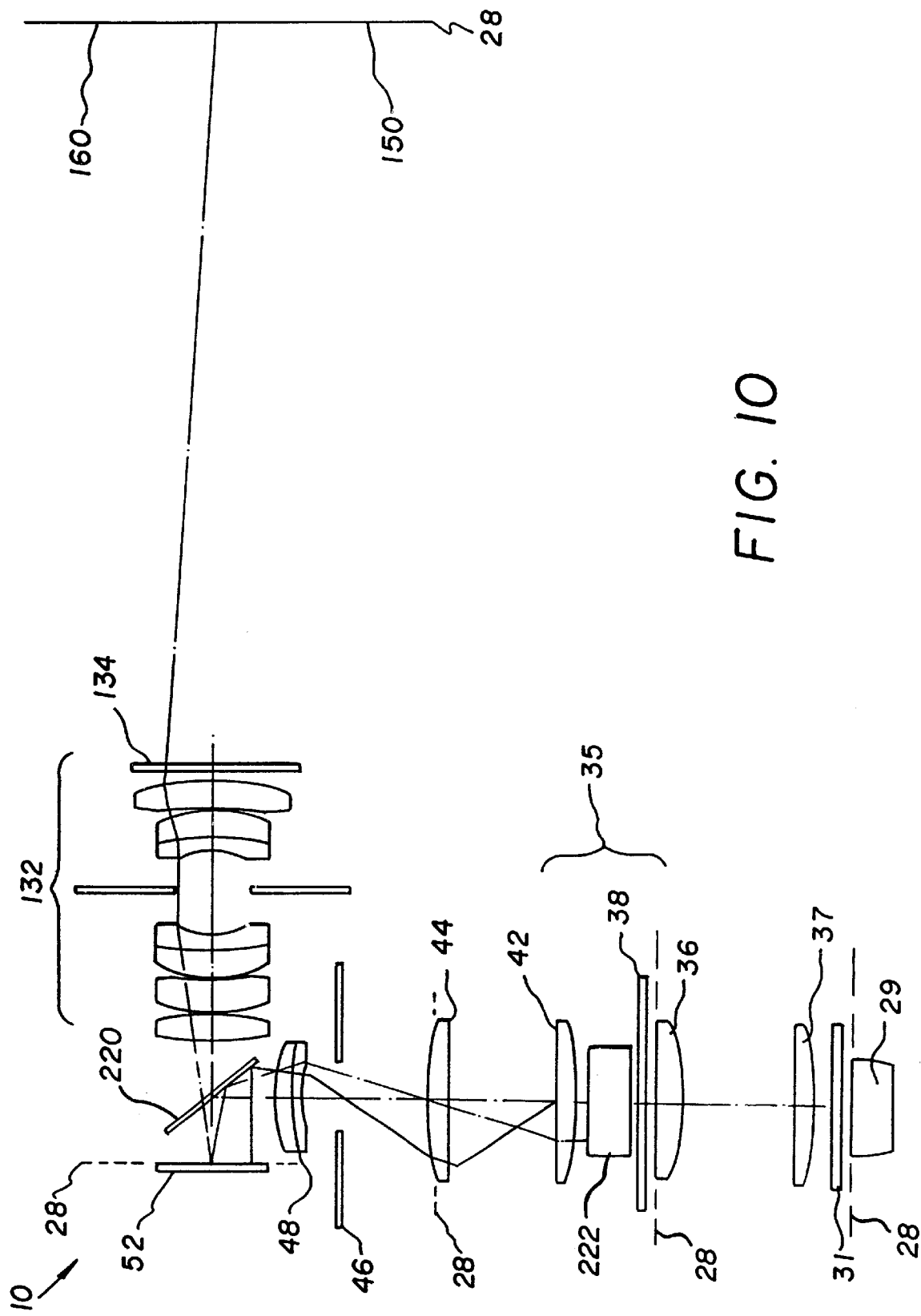
FIG. 10 is a schematic view showing Image forming assembly components for a printing apparatus according to the present invention, using an alternative arrangement of Image forming assembly components.
Figure 11:
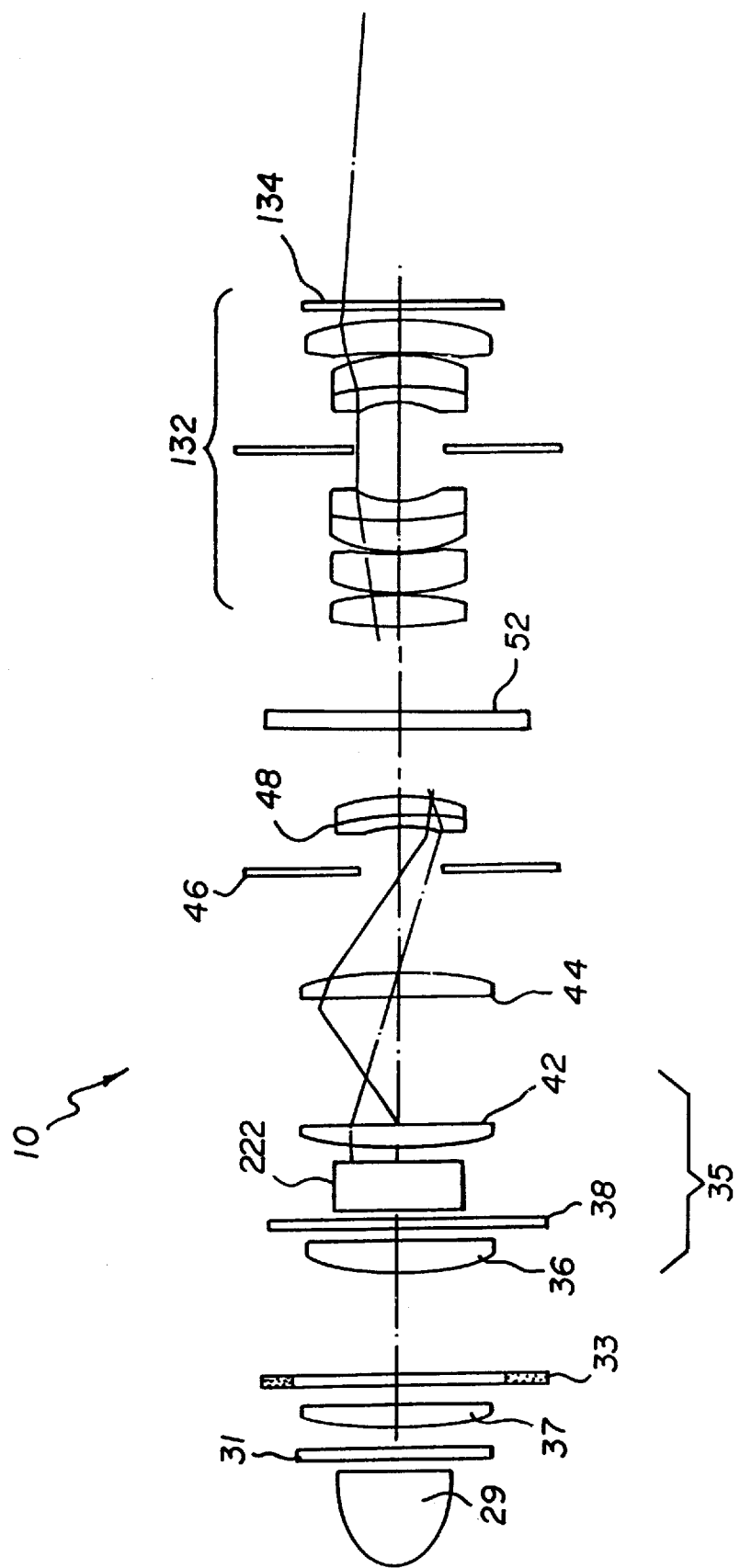
FIG. 11 is a schematic view showing Image forming assembly components for a printing apparatus according to the present invention, showing an alternative arrangement utilizing a transmissive LCD.

The design of printer 100 allows a number of alternate embodiments within the scope of the present invention. Referring to FIGS. 10 and 11 there are shown possible alternate arrangements of components for image forming assembly 10. Notable changes to components include the following:

(1) Use of an alternative uniformizing component, such as an integrating bar 222 in place of lenslet array assembly 40. While lenslet arrays, in general, may provide better uniformity, integrating bar 222 can be an appropriate substitute for monochromatic printing applications, particularly when using coherent light sources, such as lasers. The integrating bar may help to minimize coherence effects.

(2) Use of an alternative to polarization beamsplitter element 50. A pellicle 220 can provide sufficient beamsplitting capability for monochromatic printing and can offer cost-saving advantages over polarization beamsplitter elements 50. Pellicles 220 are well suited to monochromatic applications, such as is disclosed above (but may cause image artifacts with polychromatic systems). Specifically, pellicles 220 do not extinguish or redirect light with the efficiency of a beamsplitting cube. In addition, over a narrow wavelength band, some pellicles 220 can demonstrate interference effects. For example, if an optical system were to have competing narrow wavelength bands, such as 630 nm and 460 nm, interference effects in the different wavelength regions could cause significantly non-uniform illumination at the modulator. Additionally, pellicles 220 are more useful in systems where light intensity is not a major concern, since pellicles are not designed for applications using high levels of optical power. It should be noted that, because the pellicle is not, by itself, a polarization-sensitive device, a prepolarizer is required. If used in image forming assembly 10 of the present invention, the first polarizer would eliminate 50% of incident unpolarized light; the pellicle would then eliminate another 50% of the remaining light. Because of this, spatial light modulator 52 would receive only 25% of the potential illumination. It is instructive to note that, in image forming assembly 10 as described above, light intensity demands are not severe and illumination is monochromatic for any given exposure, allowing the use of pellicle 220 as an alternative.

(3) Use of alternate beam-steering components. Suitable alternatives for beam steering other than use of polarization beamsplitter element 50 or pellicle 220 include a simple turning mirror or prism.

(4) Use of transmissive LCD components for spatial light modulator 52. For some COM applications, there may be sufficient resolution and contrast available using a transmissive LCD spatial light modulator. As is shown in FIG. 11, use of a transmissive modulator for spatial light modulator 52 removes the turn in the optics path and can simplify the design.

Because of the digital addressability of the LCD device and the flexibility in varying level of illumination, the printing solutions described above provide an adequate bit depth and reasonable timing for use in a COM printer. Using the printer of the present invention takes advantage of economical, commodity LCD technology to produce low cost, high resolution prints, with high productivity.

The use of reflective liquid crystal technology allows for very high resolution two-dimensional printing. Furthermore, the use of dithering, particularly sub-apertured dithering provides means to further increase the resolution and avoid artifacts due to modulator site failure.

Preferred Embodiment for Light Source 29

Figure 12:
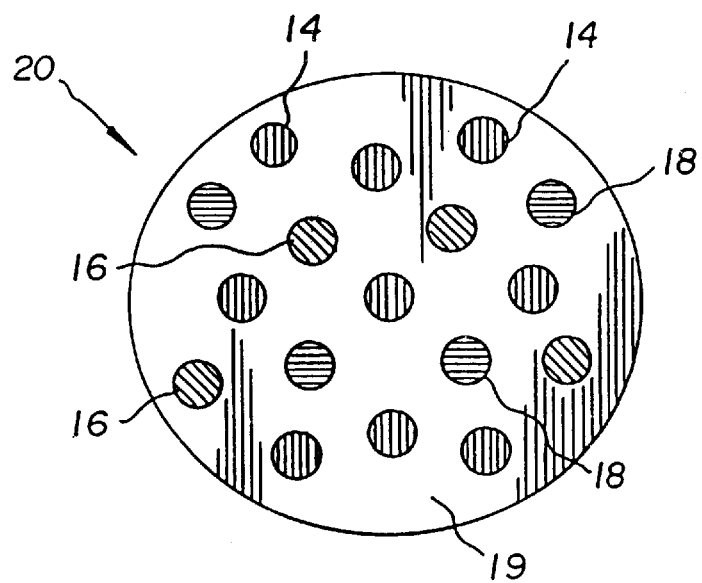
FIG. 12 is a plan view showing a two-dimensional arrangement of LEDs used as part of a light source.

Light source 29 of illumination optics 11 must provide monochromatic light at a wavelength that is best suited to the sensitivity of photosensitive media 160. In the present invention, light source 29 is selectable, allowing printer 100 to utilize any of a number of different types of photosensitive media 160. In the preferred embodiment, light source 29 comprises one or more LEDs, grouped by emitted wavelength. Referring to FIG. 12, there is shown an arrangement of LEDs within a circular aperture 20, for example: red wavelength LEDs 14, green wavelength LEDs 16, and blue wavelength LEDs 18. With this arrangement, the LEDs are distributed so as to provide exposure light evenly. LEDs of a desired color are energized under the control of control logic processor 210, based on the wavelength required for a specific photosensitive media 160. Using this illumination method, printer 100 can be automatically adapted to use one or another type of photosensitive media 160 and to provide the required exposure characteristics needed by that type of photosensitive media 160. For a photosensitive media 160 that is intended for exposure by red light, control logic processor 210 would enable red wavelength LEDs 14, for example.

Figure 13:
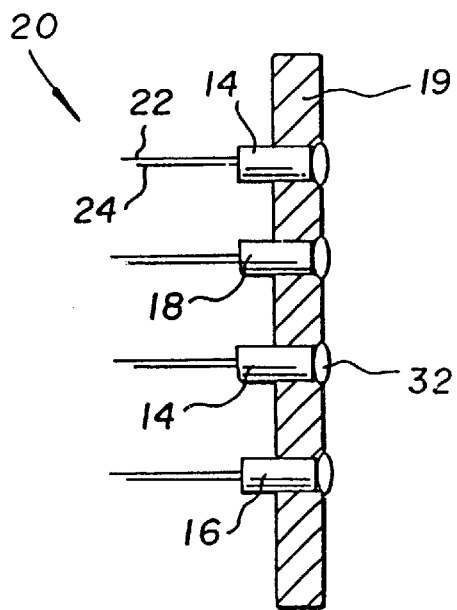
FIG. 13 is a cross-sectional view of an apparatus for holding LEDs and collimating lenses for LEDs.

Referring to FIG. 13, there is shown a cross-sectional view of red LEDs 14, green LEDs 16, and blue LEDs 18 mounted with collimating lenses 32 into a frame 19. Individual collimating lenses 32 are optional but might be useful to aid in encapsulation and position of LEDs 14, 16, and 18.

Figure 14:
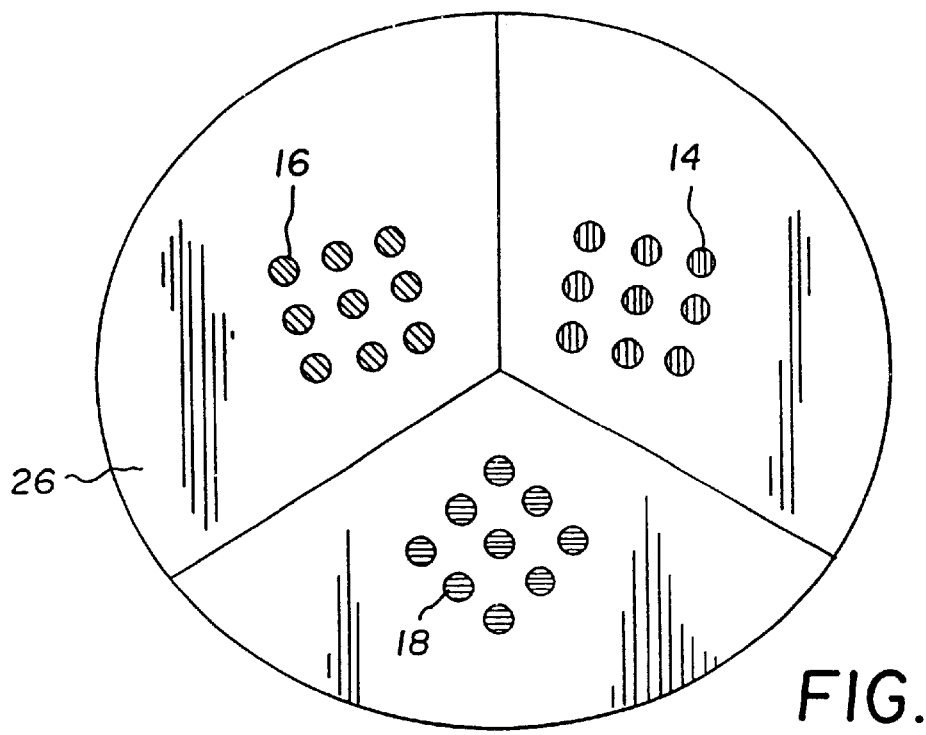
FIG. 14 is a plan view of a rotatable wheel of LEDs used as part of a light source.

Referring to FIG. 14, there is shown another alternative embodiment using LEDs 14, 16, and 18. A rotatable LED wheel 26 comprises grouped LEDs 14, 16, and 18 that can be rotated into position by control logic processor 210 for providing exposure energy. The arrangement of FIG. 14 might be most suitable where it is advantageous to obtain concentrated light energy from a close grouping of multiple LEDs 14, 16, and 18. However, the disadvantage presented using the arrangement of FIG. 14 relates to rotation of rotatable LED wheel 26, since this requires an added motor or manual operation. The preferred embodiment would use distributed LEDs 14, 16, and 18 as shown in FIG. 12, arranged for selective energization as electronically switched by control logic processor 210. The arrangement of FIG. 12 requires no moving parts and can be implemented at lower cost than that shown in FIG. 14.

LEDs 14, 16, and 18 would be specified based on exposure sensitivity characteristics of each type of photosensitive media 160 to be used in printer 100. A number of alternate arrangements are possible, including use of LEDs of any suitable color, emitting the desired wavelength. For example, different groupings of red LEDs could be used for types of photosensitive media 160 that differ only slightly in terms of wavelength response. A single LED could be used for any one photosensitive media 160 type; however, the use of multiple LEDs provides additional output intensity to be directed by image forming assembly 10.

Alternate Light Source Options

There are a number of less desirable alternatives for light source 29 that would allow the use of multiple types of photosensitive media 160 to be used by the same printer 100. Referring to the example of FIG. 15, a halogen lamp 218 could be used to provide a broadband light beam 226 that is transmitted through a selectable filter element 233a, 233b, or 233c contained in a rotatable filter wheel 224 to provide a monochromatic light beam 228. Selectable filter elements 233a, 233b, or 233c could be, for example, red, green, and blue filters. As another example, selectable filter elements 233a, 233b, or 233c could each be red filters, each filter optimized for transmitting a different wavelength in the red visible region. In any event, monochromatic light beam 228 is output from light source 29 and is directed by image forming assembly 10 to provide exposure energy.

Figure 15:
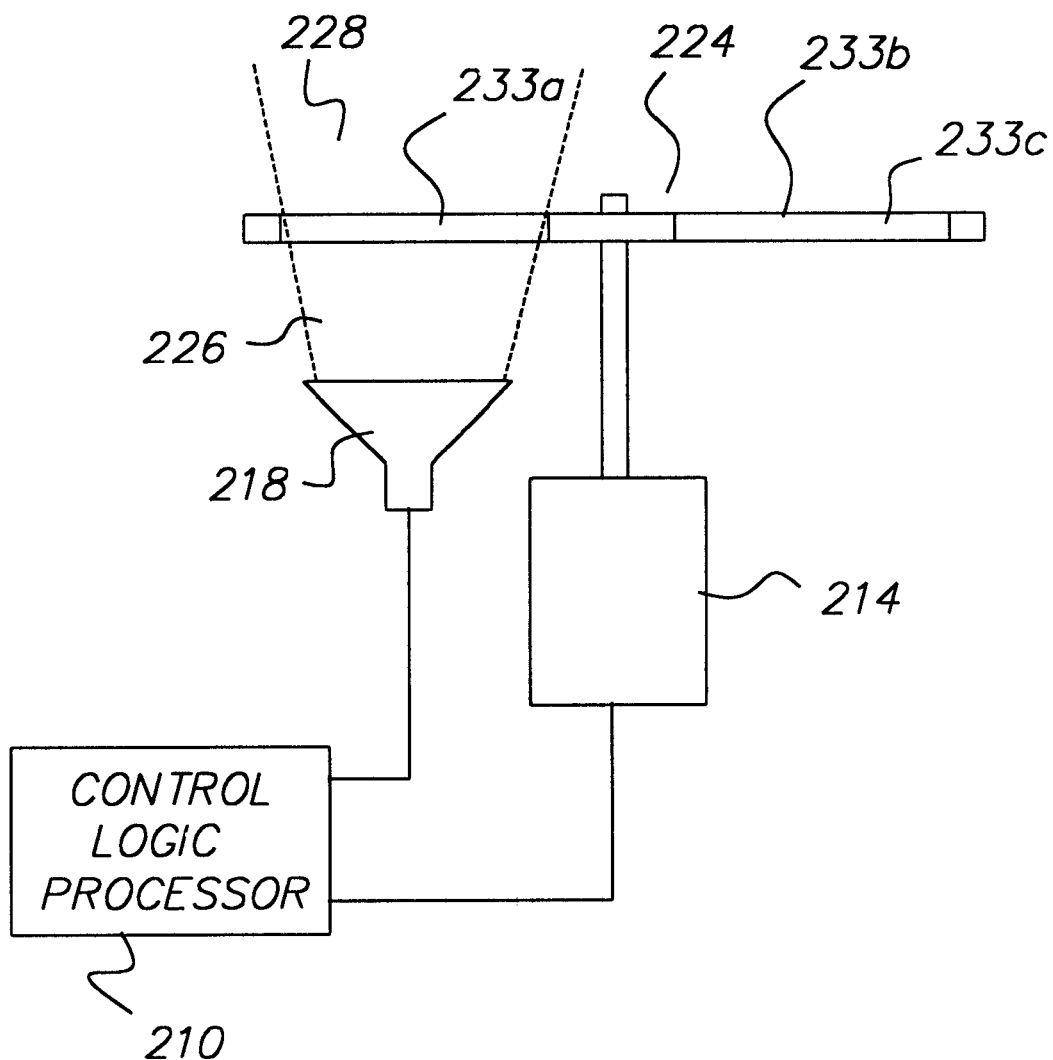
FIG. 15 is a schematic view showing an alternate embodiment of a light source.

Three filters 233a, 233b, or 233c are shown in FIG. 15; however, fewer or more filters 233a, 233b, or 233c could be deployed on rotatable wheel 224. Use of rotatable wheel 224 allows one filter 233a, 233b, or 233c at a time to be positioned in the optics path by a motor 214 as controlled by control logic processor 210. Control logic processor 210 can include programming logic that provides instructions for which filter 233a, 233b, or 233c to use for a certain photosensitive media 160 type, for example.

Alternate means could be employed for switching the suitable filter 233a, 233b, or 233c into the optics path. For example, filter 233a, 233b, or 233c could be manually positioned in the optics path by an operator.

It can be seen, however, that there are advantages in eliminating moving parts such as rotatable filter wheel 224. Alternative arrangements could employ multiple lamps 218 or even multiple lasers as alternate light source 29. However, arrangements such as these add cost, size, and complexity to the design of printer 100.

In addition to providing light at specific wavelengths, the present invention also allows the use of different types of light sources within the same printer 100. This would enable printer 100, for example, to use red LEDs 14 as light source 29 for one type of media and to use a halogen lamp equipped with a blue filter 33 (FIG. 11) as light source 29 for a different type of media. Different light sources 29 could be moved into or switched into place in the optics path in modular fashion, as needed, based on the media type loaded in printer 100.

It can be seen that printer 100 can be adapted for monochromatic imaging onto photosensitive media 160 of different types by switching to the appropriate light source 29 using the apparatus and method disclosed herein. It can be appreciated that there could be a number of ways in which selection of a light source 29 could be made by an operator entry or action.

Automated Sensing of Media Type and Response

As an option, an automated mechanism could be employed to sense a loaded photosensitive media 160 type and to automatically select the appropriate light source 29 based on the type of media 160 sensed. Referring back to FIG. 1, a sensor 234, connected to control logic processor 210, is disposed to sense an encoding 236 that is coupled to film supply 202. There are a number of possible configurations for sensor 234 and encoding 236, including the following, for example:

| Where encoding 236 has the form: | Sensor 236 would be: |
|---|---|
| Barcode or other optical encoding | Barcode reader or other optical reader, such as built-in or hand-held scanner. |
| Transponder containing a memory that includes identifying data for the media, such as an RF transponder, "SAMPT" (Selective Addressable Multi-Page Transponder), part number "RI-TRP-IR2B" available from Texas Instruments, Incorporated. | Transceiver, such as an RF transceiver, for example, "Model S2000" ™, available from Texas Instruments, Incorporated, located in Dallas, Texas, USA. |
| Magnetically encoded strip | Magnetic strip reader |
| Memory device, such as an I-button, manufactured by Dallas Semiconductor Corp., Dallas, TX | I-button reader |
| Trace pattern, such as an embedded trace pattern | Trace pattern reader |

Encoding 236 could be printed or attached to photosensitive media 160 packaging or could be provided from a network connection or manually entered by an operator. Using this option with the preferred embodiment, upon sensing media 160 type from encoding 236, control logic processor 210 would respond by energizing the appropriate LEDs for the media 160 type.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

PARTS LIST

10. Image forming assembly
11. Illumination optics
14. Red LED
16. Green LED
18. Blue LED
19. Frame
20. Circular aperture
26. LED wheel
28. Conjugate planes
29. Light source
31. Infrared rejecting filter
32. Collimating lens
33. Filter
35. Uniformizer
36. Field lens
37. Lens
38. Linear polarizer
40. Lenslet array assembly
40a. Lenslet array
40b. Lenslet array
41. First lens assembly
42. Field lens
44. Field lens
46. Aperture stop
48. Relay lens
49. Compound lens
50. Polarization beamsplitter element
52. Spatial light modulator
52'. LCD spatial modulator
53. Individual modulator site
54. Actuator
61. First modulator position
62. Second modulator position
63. Modulator sites
64. Third modulator position
65. Fourth modulator position
70. Actuator
72. Actuator
74. Cover glass
74'. Cover glass
76. Polarization compensator
76'. LCD
78'. Frame
80. Black regions
82. Clear areas
84. First modulator position
86. Second modulator position
88. Third modulator position
90. Fourth modulator position
92. Modulator sites
94. Non-reflecting region
100. Printer
132. Print lens assembly
134. Polarizer
142. S-polarization state of light
144. P-polarization state of light
150. Image plane
160. Photosensitive media
184. Mask
202. Film supply
204. Exposure section
206. Film processor
208. Film storage unit
210. Control logic processor
212. Media handling subsystem
214. Motor
218. Lamp
220. Pellicle
222. Integrating bar
224. Rotatable filter wheel
226. Broadband light beam
228. Monochromatic light beam
233a. Selectable filter elements
233b. Selectable filter elements
233c. Selectable filter elements
234. Sensor
236. Encoding

What is claimed is:

1. An apparatus for printing monochrome images from digital image data onto a selected photosensitive medium selected from a plurality of photosensitive media compatible with said monochrome printing apparatus, the apparatus comprising:
   a light source selector for selecting, from a plurality of light source elements, a monochromatic light source that is suited to said selected photosensitive medium;
   a uniformizer for uniformizing of light emitted from said monochromatic light source;
   a polarizer for filtering said uniformized light to provide a polarized beam having a predetermined polarization state;
   a spatial light modulator having a plurality of individual elements capable of altering the polarization state of said polarized beam to provide an exposure beam for printing, the state of each of said elements controlled according to said digital image data;
   a first lens assembly for directing said polarized beam to said spatial light modulator;
   a second lens assembly for directing said exposure beam onto said selected photosensitive medium; and
   an actuator coupled to said spatial light modulator, the actuator disposed to provide motion for exposure dithering.

2. The apparatus of claim 1 wherein said spatial light modulator comprises a transmissive LCD.

3. The apparatus of claim 1 wherein said spatial light modulator comprises a reflective LCD.

4. The apparatus of claim 1 wherein said spatial light modulator comprises a digital micromirror device.

5. The apparatus of claim 1 wherein said uniformizer comprises a lenslet array.

6. The apparatus of claim 1 wherein said uniformizer comprises an integrating bar.

7. The apparatus of claim 1 wherein said monochromatic light source comprises a lamp.

8. The apparatus of claim 1 wherein said monochromatic light source comprises at least one light emitting diode.

9. The apparatus of claim 1 wherein said monochromatic light source comprises a laser.

10. The apparatus of claim 7 wherein said monochromatic light source comprises a monochromatic filter.

11. The apparatus of claim 7 wherein an infrared rejecting filter is located between said light source and said uniformizer.

12. The apparatus of claim 1 wherein said first lens assembly comprises a beamsplitter.

13. The apparatus of claim 1 wherein said first lens assembly comprises a pellicle.

14. The apparatus of claim 1 wherein said first lens assembly comprises a turning mirror.

15. The apparatus of claim 1 wherein said first lens assembly comprises a prism.

16. The apparatus of claim 1 wherein said actuator comprises a piezoelectric actuator.

17. The apparatus of claim 12 wherein said beamsplitter comprises a polarization coating.

18. The apparatus of claim 1 wherein said second lens assembly provides reduction of said images.

19. The apparatus of claim 1 wherein said second lens assembly provides magnification of said images.

20. The apparatus of claim 1 wherein said images are printed to said photosensitive medium and wherein said photosensitive medium is developed using a chemical bath.

21. The apparatus of claim 1 wherein said images are printed to said photosensitive medium and wherein said photosensitive medium is developed using heat.

22. The apparatus of claim 1 wherein said first lens assembly comprises an aperture.

23. The apparatus of claim 1 further comprising a mask in the path of said polarized beam.

24. The apparatus of claim 1 further comprising a mask in the path of said exposure beam.

25. The apparatus of claim 1 wherein said digital image data is grayscale.

26. The apparatus of claim 1 wherein said light source comprises a motor.

27. The apparatus of claim 1 wherein said light source comprises a rotatable member.

28. The apparatus of claim 1 wherein said light source comprises a filter.

29. The apparatus of claim 1 further comprising:
  (a) a sensor disposed to sense an encoding coupled to said selected photosensitive medium, wherein said encoding identifies a type of said selected photosensitive medium; and
  (b) a logic processor capable of communicating with said sensor and, based on said type of said selected photosensitive medium, capable of energizing said light source.

30. The apparatus of claim 29 wherein said sensor reads an optical encoding.

31. The apparatus of claim 29 wherein said sensor reads a magnetic encoding.

32. The apparatus of claim 29 wherein said sensor is a transceiver.

33. The apparatus of claim 29 wherein said sensor is an RF transceiver.

34. The apparatus of claim 29 wherein said encoding is stored in a portable memory device.

35. A method for printing a monochrome image from digital image data onto a selected photosensitive medium selected from a plurality of types of photosensitive media compatible with a printing apparatus, the method comprising:
  (a) enabling a substantially monochromatic light source selected from a set of available light sources in said printing apparatus, said selected substantially monochromatic light source chosen based on said type of said selected photosensitive medium;
  (b) uniformizing a wavefront of said substantially monochrome light source to provide a uniformized source beam;
  (c) modulating said uniformized source beam in accordance with said digital image data to provide an exposure beam;
  (d) incrementally altering a position of a spatial light modulator to dither said exposure beam; and
  (e) directing said dithered exposure beam onto said selected photosensitive medium.

36. The method of claim 35 wherein the step of enabling a substantially monochromatic light source from a set of available light source elements comprises the step of positioning a filter.

37. The method of claim 35 wherein the step of enabling a substantially monochromatic light source from a set of available light source elements comprises the step of selectively energizing individual light-emitting components.

38. The method of claim 35 wherein the step of uniformizing the wavefront of said substantially monochrome light source comprises the step of disposing an optical integrator in the path of said substantially monochrome light source.

39. The method of claim 35 wherein the step of uniformizing the wavefront of said substantially monochrome light source comprises the step of disposing a beamsplitter in the path of said substantially monochrome light source.

40. The method of claim 35 wherein the step of modulating said uniformized source beam comprises the step of directing said uniformized source beam to a spatial light modulator.

41. The method of claim 40 further comprising the step of modulating said spatial light modulator.

42. The method of claim 41 wherein the step of modulating said spatial light modulator comprises the step of varying the in time of an element of said spatial light modulator.

43. The method of claim 41 wherein the step of modulating said spatial light modulator comprises the step of varying the drive signal provided to an element of said spatial light modulator.

44. The method of claim 35 wherein the step of directing said exposure beam comprises the step of magnifying said exposure beam.

45. The method of claim 35 wherein the step of directing said exposure beam comprises the step of demagnifying said exposure beam.

46. The apparatus of claim 1 wherein said actuator comprises a piezoelectric actuator.

47. An apparatus for printing monochrome images from digital image data onto a selected photosensitive medium selected from a plurality of photosensitive media compatible with said monochrome printing apparatus, the apparatus comprising:
  a light source selector for selecting, from a plurality of light source elements, a monochromatic light source that is suited to said selected photosensitive medium;
  a uniformizer for uniformizing of light emitted from said monochromatic light source;
  a polarizer for filtering said uniformized light to provide a polarized beam having a predetermined polarization state;
  a spatial light modulator having a plurality of individual elements capable of altering the polarization state of said polarized beam to provide an exposure beam for printing, the state of each of said elements controlled according to said digital image data;
  a first lens assembly for directing said polarized beam to said spatial light modulator;
  a second lens assembly for directing said exposure beam onto said selected photosensitive medium;
  a mask disposed in the path of said exposure beam; and
  an actuator coupled to said mask, the actuator disposed to provide motion for exposure dithering.

48. An apparatus for printing monochrome images according to claim 47 wherein said mask is a pattern on cover glass proximate to said spatial light modulator.

49. A method for printing a monochrome image according to claim 35 wherein the step of incrementally altering a position of a spatial light modulator comprises the step of translating said spatial light modulator horizontally.

50. A method for printing a monochrome image according to claim 35 wherein the step of incrementally altering a position of a spatial light modulator comprises the step of translating said spatial light modulator vertically.

51. A method for printing a monochrome image according to claim 35 wherein the step of incrementally altering a position of a spatial light modulator comprises the step of translating said spatial light modulator diagonally.

52. A method for printing a monochrome image from digital image data onto a selected photosensitive medium selected from a plurality of types of photosensitive media compatible with a printing apparatus, the method comprising:

(a) enabling a substantially monochromatic light source selected from a set of available light sources in said printing apparatus, said selected substantially monochromatic light source chosen based on said type of said selected photosensitive medium;

(b) uniformizing a wavefront of said substantially monochrome light source to provide a uniformized source beam;

(c) modulating said uniformized source beam in accordance with said digital image data to provide an exposure beam;

(d) incrementally altering a position of a mask to dither said exposure beam; and (e) directing said dithered exposure beam onto said selected photosensitive medium.

* * * * *